Patented Jan. 19, 1932 1,841,817

UNITED STATES PATENT OFFICE

FILIP KAČER, OF MANNHEIM, GERMANY, ASSIGNOR TO GENERAL ANILINE WORKS, INC., OF NEW YORK, N. Y., A CORPORATION OF DELAWARE

SULPHUR DYES OF THE ANTHRAQUINONE SERIES AND PROCESS OF MAKING

No Drawing. Application filed April 3, 1930, Serial No. 441,427, and in Germany April 11, 1929.

The present invention relates to the production of vat dyestuffs derived from mercapto-methylanthraquinones.

I have found that fast vat dyestuffs are obtained by heating β-mercaptoanthraquinone containing a methyl group in ortho position to the mercapto group, or derivatives thereof, with sulphur. Since the said mercaptoanthraquinones are suitably obtained by acting on the corresponding halogen derivatives with compounds derived from hydrogen sulphide, the preparation of the initial material and the production of the vat dyestuffs may be combined in one operation by acting on β-halogenanthraquinones substituted in an ortho position to the halogen atom by a methyl group with a compound derived from hydrogen sulphide and simultaneously with sulphur. For the substitution of the halogen atoms by sulphur, the sulphides and thiocyanates of the alkali and alkaline earth metals are especially suitable. These may, however, be replaced by adding the hydroxides or oxides of the alkali or alkaline earth metals, or their salts with weak acids, which substances are converted into sulphides or polysulphides when heated with sulphur.

The following examples will further illustrate the nature of this invention but the invention is not restricted to the examples. The parts are by weight.

Example 1

1 part of 2-mercapto-1-methylanthraquinone prepared for example from 2-chlor-1-methylanthraquinone by treatment with sodium sulphide, is mixed with 4 parts of sulphur and fused at about from 250° to 260° C. for from 3 to 4 hours. The finished melt is extracted with sodium sulphide solution to remove the surplus sulphur. The residual dyestuff is recrystallized from sulphuric acid and is purified by treatment with sodium hypochlorite solution. It is obtained in a chemically pure state by crystallization from organic solvents of high boiling point, such as trichlorbenzene or nitrobenzene. It then forms orange colored crystals, which dissolve to a red-violet solution in sulphuric acid, and to an olive colored solution in oleum containing 23 per cent of $SO_3$. The hydrosulphite vat is also olive, giving clear orange yellow dyeings, of great fastness, on cotton.

Example 2

A mixture of 256 parts of 3-chlor-2-methylanthraquinone, 80 parts of anhydrous sodium sulphide and 1000 parts of sulphur is heated for from 3 to 4 hours in an oil-jacketed pan, provided with stirrer and an exhaust pipe, at a bath temperature of from 270° to 275° C. The melt is then allowed to cool, reduced to powder and freed from the surplus sulphur by extraction with sodium sulphide solution. The resulting dyestuff is identical with that described in Example 6 hereinafter given.

Example 3

51 parts of 3-chlor-2-methylanthraquinone, 104 parts of crystallized sodium sulphide and 640 parts of sulphur are heated for four hours, in a pressure vessel, at from 250° to 260° C. The resulting dyestuff is purified by extraction with water, and, if necessary, by treatment with sodium hypochlorite solution. It is identical with the dyestuff obtained according to Example 2.

Example 4

128 parts of 3-chlor-2-methylanthraquinone, 1000 parts of sulphur and 80 parts of anhydrous sodium acetate are fused together for 3 to 4 hours at 240° to 250° C. The cold melt is powdered, and is freed from the surplus sulphur by extraction with sodium sulphide solution. The resulting dyestuff is identical with that obtained according to Example 2.

The sodium acetate may be replaced, with equal success, by the corresponding quantities of sodium carbonate, burnt lime, potassium thiocyanate or potassium xanthate.

Example 5

51 parts of 2-chlor-1-methylanthraquinone are fused for 4 hours at from 250° to 260° C. with 200 parts of sulphur and 16 parts of anhydrous sodium sulphide. The melt is powdered when cold, and the dyestuff is freed from surplus sulphur by extraction with sodium sulphide solution in the usual manner. It is identical with the dyestuff obtained according to Example 1.

*Example 6*

1 part of 3-mercapto-2-methylanthraquinone, which may be obtained by treating 3-chloro-2-methylanthraquinone with sodium sulphide, is mixed with 4 parts of sulphur and the mixture is fused for from 3 to 4 hours at about 250° C. The melt is then boiled up with an aqueous solution of sodium sulphide to remove the excess of sulphur. The pure dyestuff which is obtained as a residue in the form of a brownish yellow crystalline powder dissolves in concentrated sulphuric acid giving a dull blue violet coloration, and in fuming sulphuric acid containing 23 per cent of sulphur trioxide giving a yellowish green coloration. With an alkaline solution of hydrosulphite the dyestuff furnishes a greenish olive yellow vat from which cotton is dyed a clear yellow.

What I claim is:—

1. A process of producing vat dyestuffs of the anthraquinone series which comprises heating a $\beta$-mercapto-anthraquinone substituted in an ortho position to the mercapto group by a methyl group with sulphur.

2. A process of producing vat dyestuffs of the anthraquinone series which comprises heating 2-mercapto-1-methylanthraquinone with sulphur.

3. A process of producing vat dyestuffs of the anthraquinone series which comprises heating a $\beta$-halogen-anthraquinone substituted in an ortho position to the halogen atom by a methyl group with a salt of hydrogen sulphide and with sulphur.

4. A process of producing vat dyestuffs of the anthraquinone series which comprises heating 2-chlor-1-methyl-anthraquinone with sulphur and an alkali metal sulphide.

5. As new article of manufacture the vat dyestuff derived from anthraquinone crystallizing from trichlorbenzene in orange needles, dissolving in sulphuric acid to give a red violet solution, in 23 per cent oleum to give an olive solution, dyeing cotton from an olive hydrosulphite vat clear orange yellow shades and which is obtainable by heating 2-mercapto-1-methylanthraquinone with sulphur.

In testimony whereof I have hereunto set my hand.

FILIP KAČER.